United States Patent [19]
Suzuki et al.

[11] Patent Number: 5,014,747
[45] Date of Patent: May 14, 1991

[54] PRESSURE CONTROL VALVE

[75] Inventors: Akira Suzuki; Katsuya Tanaka, both of Aichi, Japan

[73] Assignee: Aisin AW Kabushiki Kaisha, Japan

[21] Appl. No.: 430,365

[22] Filed: Nov. 2, 1989

[30] Foreign Application Priority Data

Nov. 9, 1988 [JP] Japan .................. 63-281414

[51] Int. Cl.⁵ .................. F15B 13/044
[52] U.S. Cl. .................. 137/625.65; 251/129.16
[58] Field of Search .............. 137/625.65; 251/129.16

[56] References Cited

U.S. PATENT DOCUMENTS

| | | | |
|---|---|---|---|
| 2,858,487 | 10/1958 | Immel . | |
| 3,486,801 | 12/1969 | Frayer | 137/625.64 X |
| 3,880,476 | 4/1975 | Belart et al. . | |
| 4,155,535 | 5/1979 | Seamone | 137/625.69 X |
| 4,250,922 | 2/1981 | Will et al. . | |
| 4,316,599 | 2/1982 | Bouvet et al. . | |
| 4,535,816 | 8/1985 | Feder et al. . | |
| 4,579,145 | 4/1986 | Leiber et al. . | |
| 4,605,197 | 8/1986 | Casey et al. | 251/30.01 |
| 4,635,683 | 1/1987 | Nielsen . | |
| 4,662,605 | 5/1987 | Garcia . | |
| 4,739,797 | 4/1988 | Scheffel | 137/625.69 |
| 4,838,313 | 6/1989 | Kobayashi et al. | 137/625.65 |
| 4,838,517 | 6/1989 | Miki et al. | 137/625.65 |
| 4,838,518 | 6/1989 | Kobayashi et al. | 137/625.65 |

FOREIGN PATENT DOCUMENTS

| | | |
|---|---|---|
| 2255272 | 11/1972 | Fed. Rep. of Germany . |
| 60-52509 | 4/1985 | Japan . |
| 61-2983 | 1/1986 | Japan .................. 137/625.65 |
| 63-298414 | 12/1988 | Japan . |
| 63-298415 | 12/1988 | Japan . |
| 63-298416 | 12/1988 | Japan . |
| 63-298417 | 12/1988 | Japan . |
| 1117872 | 3/1983 | United Kingdom . |

Primary Examiner—Gerald A. Michalsky
Attorney, Agent, or Firm—Lorusso & Loud

[57] ABSTRACT

A pressure control valve has a valve sleeve, a spool valve mounted for sliding in the valve sleeve in response to a load by an electromagnet, a spring load, and an output pressure feedback load, and the electromagnet portion capable of moving the spool valve. The spool valve has an oil passage capable of feeding back the output pressure, the feedback oil passage being formed diagonally in the land portion. A periphery of an end surface of the land portion, or the same of the supply port, output port, or the exhaust port of the sleeve is provided with a cutout. Output pressure generated at the output port is transmitted through the feedback oil passage, thereby damping and stabilizing the operation of the spool valve. Since the cutout is formed as described above, a rapid pressure change due to the movement of the spool valve can be eliminated, preventing generation of buzz.

4 Claims, 3 Drawing Sheets

PRESSURE CONTROL VALVE

BACKGROUND OF THE INVENTION

The present invention relates to a pressure control valve, and, more particularly, to an electromagnetic pressure control valve capable of controlling fluid pressure in response to an electric signal.

Pressure control valves are represented by a diaphragm type pressure control valve wherein the surface of the diaphragm receives feedback pressure and a spool type pressure control valve wherein the end surface of the spool receives feedback pressure. The present invention relates to an electromagnetic pressure-control valve of the spool type.

The spool type electromagnetic pressure-control valve is usually designed in such a manner that a load caused by the electromagnet, a spring load, and an output pressure feedback load act on a spool valve which slides in a valve sleeve having a supply port, an output port, and an exhaust port. Its structure is arranged such that the output pressure is controlled to a level which corresponds to the electric signal supplied to the electromagnet portion by arranging a balance among the above-described loads (see Japanese Patent Laid-Open No. 60-52509).

The pressure control valves of the type described above are arranged in such a manner that the operation of the spool valve is stabilized by feeding back the output pressure to either end surface of the spool valve, where a feedback oil passage is formed in the outer portion of a valve sleeve of a pressure governing valve portion thereof in order to feed back the output pressure.

However, the above-described structure of the conventional pressure control valve arranged such that the feedback oil passage is formed in the outer portion of the valve sleeve of the pressure governing valve portion requires that the overall size of the pressure control valve to be enlarged by a degree corresponding to the feedback oil passage thus formed. Furthermore, the number of manufacturing steps is increased by forming the feedback oil passage.

Furthermore, the structure arranged such that the output pressure is fed back through the feedback oil passage thus formed does not produce a satisfactory damping effect. Therefore, it is difficult to stably and reliably operate the spool valve, and another problem of operation noise such as so-called "buzz" also arises.

SUMMARY OF THE INVENTION

An object of the present invention is to provide a pressure control valve capable of overcoming the above-described problems experienced with the conventional pressure control valves, thus obtaining a sufficient damping effect, and eliminating the necessity of a number of manufacturing processes for forming the feedback oil passage.

In order to achieve the above-described objects, a pressure control valve according to the present invention comprises a valve sleeve having a supply port, an output port, and an exhaust port; a spool valve slidably mounted in the valve sleeve and receiving a load produced by an electromagnet, a spring load, and an output pressure feedback load; and an electromagnet portion capable of moving the spool valve in response to an electric signal.

The spool valve has a feedback oil passage formed for the purpose of feeding back the output pressure. The feedback oil passage is formed diagonally through the land portion, the feedback oil passage establishing a connection between a space formed adjacent to the output port and a closed space to which output pressure is fed back.

The spool valve receives the output pressure feedback load in the same direction as that of the spring load or in the same direction as that of the load caused by the electromagnet.

The spool valve has a bevel cutout cut into a portion of the periphery of an end surface of its land portion. The valve sleeve has a cutout in a periphery of an end surface of its supply port, output port, or exhaust port.

According to the present invention, since its structure is formed as described above, output pressure generated at the output port is transmitted to the closed space via the long feedback oil passage, causing the operation of the spool valve to be stabilized, and a sufficient damping effect to be obtained.

Furthermore, since it is not necessary to individually form a feedback oil passage in the valve sleeve portion, the size and the number of the manufacturing steps for the pressure control valve can be reduced.

Because the spool valve has a bevel cutout in the periphery of the end surface of its land portion while the valve sleeve has a cutout in the periphery of the end surface of the supply port, the output port, or the exhaust port. A rapid pressure change due to the movement of the spool valve can be eliminated preventing generation of buzz.

BRIEF DESCRIPTION OF DRAWINGS

The structure and features of the pressure control valve according to the invention will be seen by reference to the following drawings in which.

DESCRIPTION OF PREFERRED EMBODIMENT

Figure 1:
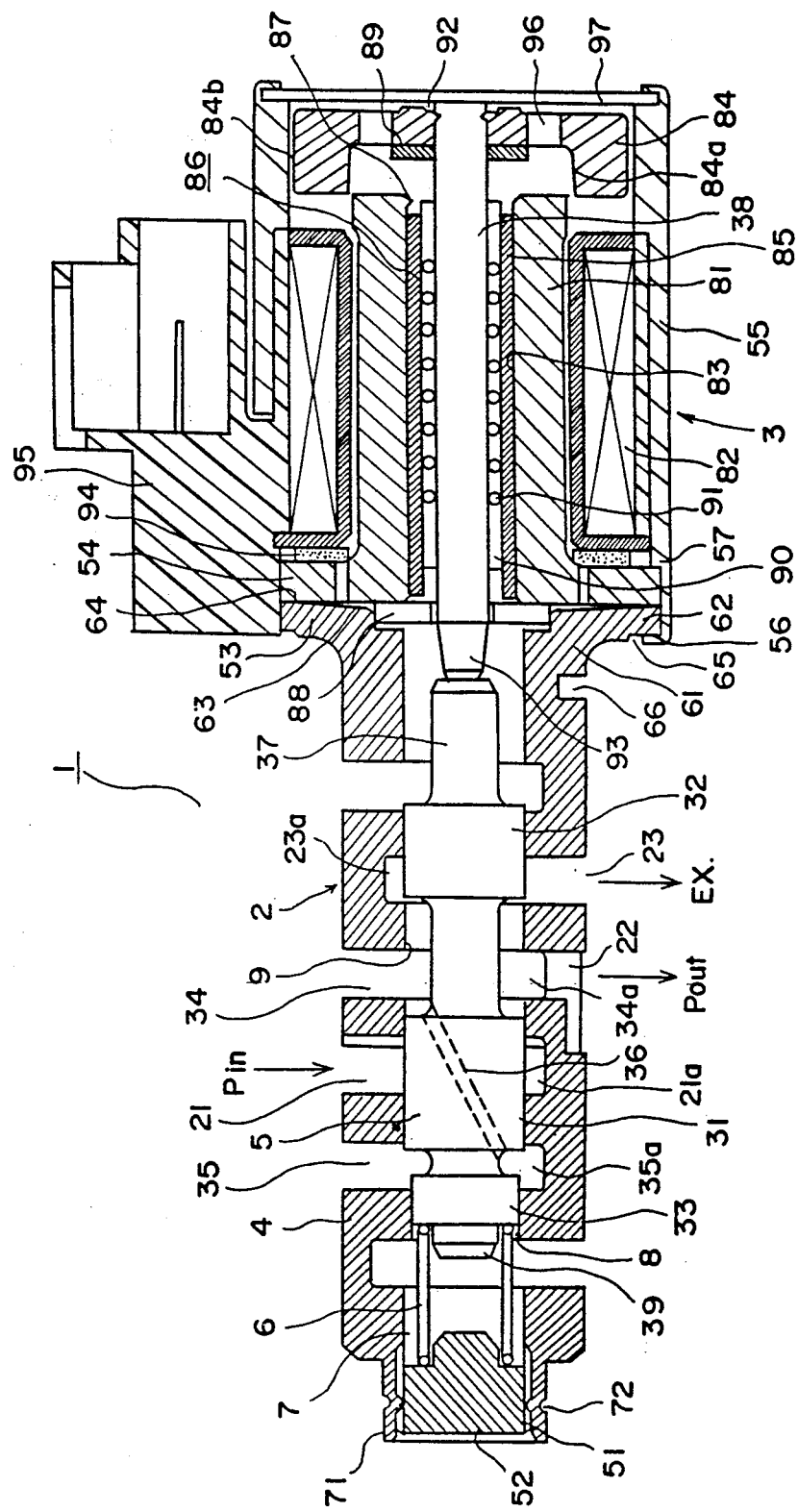
FIG. 1 is a cross sectional view which illustrates a first embodiment of a pressure control valve according to the present invention.

FIG. 1 is a cross sectional view which illustrates a first embodiment of a pressure control valve according to the present invention.

Referring to FIG. 1, a pressure control valve 1 comprises a pressure governing valve portion 2 and an electromagnet portion 3. The pressure governing valve portion 2 comprises a valve sleeve 4 and a spool valve 5. A large-diameter hole 7 accommodating a spring 6, and, next to it, a small-diameter guide hole 8 and an intermediate-diameter guide hole 9 for guiding the sliding movement of the spool valve 5 are formed in the valve sleeve 4 along its axis in the form of through holes.

A radially extending supply port 21, an exhaust port 23, and an output port 22 are formed in valve sleeve 4 in communication with the above-described guide hole 9. In order to make the flow of oil smooth at each of the ports, annular recesses 21a, 23a, 34a, and 35a are, if necessary, formed.

The spool valve 5 has two land portions 31 and 32 having the same diameter and which are intimately guided for sliding by the above-described intermediate-diameter guide hole 9. The spool valve 5 further has a small-diameter land portion 33 formed next to the land portion 31 and is in intimate sliding contact with the small-diameter guide hole 8. The distance between the two land portions 31 and 32 having the same diameter is determined so as to enable the output port 22 to alternately communicate with the supply port 21 and the exhaust port 23 at a predetermined ratio as the spool valve 5 slides. A space 34 formed between the land portions 31 and 32 is always connected to the output port 22.

A closed space 35 formed by the land portion 31, the small-diameter land portion 33, and guide holes 8 and 9 is connected to the space 34 formed between the land portions 31 and 32 by a feedback oil passage 36. The feedback oil passage 36 diagonally penetrates the land portion 31 so that output pressure obtained at the output port 22 is fed back to the closed space 35.

Since the feedback oil passage 36 diagonally penetrates the land portion 31, the oil passage can be sufficiently long to provide a satisfactory damping effect due to viscosity of oil.

Figure 2:
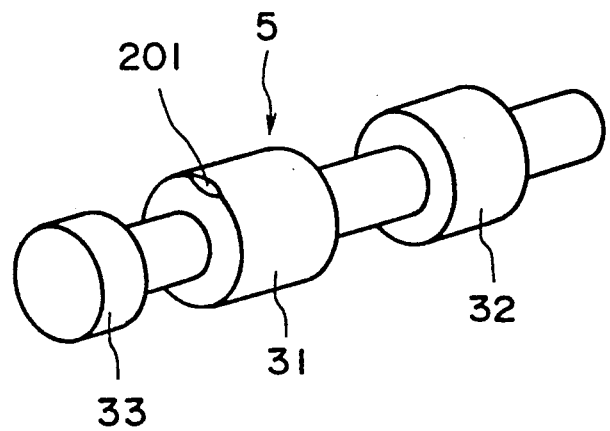
FIG. 2 is a perspective view of a spool valve according to the present invention.
Figure 3:
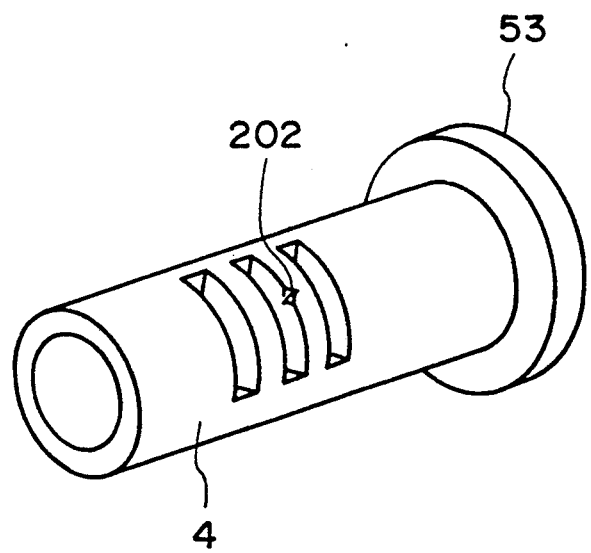
FIG. 3 is a perspective view of a valve sleeve according to the present invention.

Furthermore, since a bevel 201 is, as shown in FIGS. 2 and 3, formed on the outer periphery of the end surface of the land portion 31, 32, or the small-diameter land portion 33 of the spool valve 5, the flow of the hydraulic oil can be smoothed. As a result, the generation of buzz due to rapid pressure change caused by the movement of the spool valve 5 can be prevented.

Buzz can also be prevented by a cutout 202 formed in the periphery of the end surface of the supply port 21, the output port 22, or the exhaust port 23.

A column portion 37 projecting from the central portion of the end surface of the land portion 32 is arranged to contact a push rod 38 of the electromagnet portion 3 to be described later. A guide member 39 projecting from the central portion of the end surface of the small-diameter land portion 33 receives the above-described spring 6.

In order to apply a load to the spring 6, the hole 7 formed through the valve sleeve 4 has a thread 51 formed thereon, and a male screw member 52 which is adapted to mate with the female screw member 51 is inserted therein. As a result, the spring 6 can be pressed against the end surface of the spool valve 5 by threading the male screw member 52 into the hole 7. Therefore, the compression degree of the spring 6 can be varied by adjusting the angular degree of the rotation of the male screw member 52.

When the pressure governing valve 2 is assembled, first the spool valve 5 is inserted into the hole 8 formed in the valve sleeve 4 with the small-diameter land portion 33 positioned at the end of the hole 8. On the other hand, the spring 6 is inserted in the hole 7 so as to surround the guide member 39 and to come contact with the end surface of the small-diameter land portion 33. Thus, the spring 6 is compressed by a predetermined degree by screwing the male screw member 52 into the female screw member 51 formed in the valve sleeve 4.

The pressure governing valve portion 2 thus assembled can be coupled with the electromagnet portion 3 by placing a flange portion 53 formed at an end portion of the valve sleeve 4 adjacent to the hole 7 against a flange portion 54 of the electromagnet 3, and by bending an end portion 56 of a case 55. In order to easily bend the end portion 56 of the case 55, a stepped portion 57 is formed on the inner surface of the case 55 at a position confronting the flange portion 54. Thus, the bending is conducted with the flange portion 54 positioned on the shoulder portion of the stepped portion 57.

The flange portion 53 is constituted by a thick wall portion 61 and a thin wall portion 62, the thick wall portion 61 having a tapered portion 63 on its end surface. The tapered portion 63 is provided for the purpose of forming a recess between the flange portion 53 and the flange portion 54. That is, the two flange portions 53 and 54 contact each other at only a periphery portion 64 by virtue of the recessed portion thus formed. Therefore, only the periphery portion 64 needs to be subjected to a surface working to allow the two flange portions 53 and 54 to be brought into proper contact with each other. This enables the assembling work to be conducted easily, and realizes a satisfactory state of the assembly.

On the other hand, the periphery portion of the above-described thin wall portion 62 has an annularly stepped portion 65. The annularly stepped portion 65 is provided for the purpose of shortening the length of the assembled pressure control valve 1. That is, since the pressure control valve 1 must be mounted in a limited space, it must be shortened within the limits of possibility. Therefore, it is preferable that the thickness of each of the flange portions 53 and 54 be reduced. However, it is very difficult for the thickness of each of the two flange portions 54 and 54 to be reduced since their strength is thereby weakened. In order to overcome the problem above, the thick wall portion 61 is arranged to have a constant thickness and the above-described annularly stepped portion 65 is formed in the thin wall portion 62 which is formed integral with the thick wall portion 61. As a result, the length of the completed electromagnet portion 3 can be shortened by a degree corresponding to the size of the annular stepped portion 65.

A cutout 66 is provided for the purpose of aligning the supply port 21, the exhaust port 23, and the output port 22 with and, for example, a hydraulic pressure control system for an automobile (omitted from illustration).

After the pressure governing valve portion 2 and the electromagnet portion 3 have been coupled to each other, the above-described male screw member 52 is rotated within the female screw member 51. As a result, the degree of compression of the spring 6 is adjusted in accordance with the electric current supplied to the electromagnet 3 and with pressure outputted from the output port 22. After the adjustment has been completed, a projecting portion 71 in which the female screw member 51 is formed is crimped from the exterior as designated by reference numeral 72 in FIG. 1 so that the male screw member 52 is fixed. In order to easily conduct the crimping work, a portion of the above-described projecting portion 71 is formed as a thin wall portion.

Next, the electromagnet portion 3 will be described.

The electromagnet portion 3 comprises the cylindrical case 55 made of a magnetic material, the case 55 accommodating a cylindrical thick wall core 81 similarly made of the magnetic material. The core 81 is disposed in such a manner that the flange portion 54 formed at an end portion thereof engages the flange portion 53 of the above-described valve sleeve 4. In the inner part Of a cylindrical space formed by the case 55 and the core 81 there is provided a coil assembly 82 secured therein. Thus, a stationary portion is constituted by the cylindrical case 55, the core 81, and the coil assembly 82.

On the other hand, a movable portion is constituted by the push rod 38 inserted into the hollow 83 of the core 81 and a plunger 84 similarly made of the magnetic material and secured to another end portion of the push rod 38. The plunger 84 is arranged to be attracted by the coil assembly 82.

The plunger 84 secured to another end portion of the push rod 38, that is, on the side opposite the pressure governing valve portion 2 is formed in a thick annular shape. The plunger 84 has a cylindrical recessed portion 84a formed at its central portion on its side confronting the core 81. The recessed portion 84a can receive an end portion of the core 81 with a small clearance kept therefrom when the plunger 84 is attracted as described above. Furthermore, an outer surface 84b of the plunger 84 is arranged to confront the inner surface of the above-described case 55 with a small clearance kept therefrom similarly.

In the hollow portion 83 in the core 81 there is provided a linear type rolling bearing 86 disposed via a sleeve 85. As shown in FIG. 2, after the sleeve 85 has been inserted into the hollow portion 83 of the core 81, three projections 87 are provided by the deformation of the end surface of the core 81 for retrieving the sleeve 85.

The linear type rolling bearing 86 accommodated in the sleeve 85 is able to move freely within the space in the sleeve 85 within the limits defined by the stoppers 88 and 89. The linear type rolling bearing 86 is constituted by a brass bearing cage 90 and balls 91 accommodated in a through hole formed in the bearing cage 90, the balls 91 being arranged to slightly project over both the outer and inner surfaces of the bearing 86. The push rod 38 is supported via the thus-disposed balls 91 so that relative rotation between the push rod 38 and the sleeve 85 is enabled.

The push rod 38 is made of a non-magnetic material, for example, stainless steel having a nitrided surface forming a nitrided layer providing wear resistance. The plunger 84 is secured to an end portion of the push rod 38 as designated by reference numeral 92 by swaging. Another end portion of the push rod 38 has a tapered portion 93 confronting the column portion 37 of the spool valve 5 so that the swaging with the plunger 84 cannot be conducted if the assembling is conducted erroneously. As a result, any erroneous assembling can be prevented.

A ring 94 made of unwoven fabric is inserted between the end surface of the coil assembly 82 and the flange portion 54 of the core 81 so as to serve as a filter capable of removing foreign matter from oil.

A connector 95 for supplying electricity to the electromagnet portion 3 is secured on the outer surface of the case 55.

The plunger 84 has an oil-passage hole 96 in the form of a through hole. As a result, although oil enclosed in the electromagnet portion 3 for the purpose of preventing hydraulic pressure vibrations at high temperature acts as a resistance when the plunger 84 is moved, freely passes through the oil passage hole 96 thus formed, causing the resistance to be reduced.

A cover member 97 closes an end portion of the case 55 adjacent to the plunger 84.

When the electromagnet portion 3 is assembled, the core 81 to which the ring 94 and the coil assembly 82 are attached is inserted into the case 55 from one end and the flange portion 54 of the core 81 is positioned and secured within annular recess 57 formed on an end of the inner surface of the case 55 so that a stationary portion is formed.

On the other hand, the plunger 84 is fitted at the opposite end of the push rod 38 before being secured by swaging so that a movable portion is formed. Then, the stopper 89 and an end portion of the push rod 38 are inserted into the linear type rolling bearing 86 via the sleeve 85.

Then, the flange portion 53 of the valve sleeve 4 and the stopper 88 are inserted into the case 55 and the end portion 56 of the case 55 is bent over the outer surface of the flange portion 53 of the valve sleeve 4. As a result, the pressure control valve 1 is assembled.

As a result of the structure according to the present invention constituted as described above, when hydraulic oil is supplied to the supply port 21 of the valve sleeve 4 from a pump or the like, the hydraulic oil from the supply port 21 then reaches the land portions 31 and 32 via an opening formed between the valve sleeve 4 and the land portion 31 formed on the surface of the spool valve 5. Then, the hydraulic oil passes through the output port 22 for supply to each hydraulic pressure apparatus in the hydraulic pressure system such as an automatic transmission.

Pressure P of the hydraulic pressure oil outputted through the output port 22 is simultaneously fed back via the feedback oil passage 36. Pressure P is transmitted to the closed space 35 formed by the land portion 31, the small-diameter land portion 33 which is formed next to the land portion 31, and the valve sleeve 4 so that it is applied to the land portion 31 and the small-diameter land portion 33. As a result, an output pressure feedback load is generated which corresponding to the area difference $A_1-A_2$ given by subtracting cross sectional area $A_2$ of the small-diameter land portion 33 from cross sectional area $A_1$ of the land portion 31.

A force $(A_1-A_2)P$ generated by the pressure above is added to force $F_{SP}$ which is the urging force caused by the spring 6. Thus, the spool valve 5 is pressed to right when viewed in the drawing with synthesized force $(A_1-A_2)P+F_{SP}$. As a result, the spool valve 5 moves to displace its position in the valve sleeve 4 to the position at which the above-described synthesized force balances with force $F_{SOL}$ generated by the electromagnet portion 3.

As a result of the movement of the spool valve 5, the land portions 31 and 32 move so that the supply port 21 and the exhaust port 23 of the valve sleeve 4 are controlled in such a manner that they are opened/closed at a predetermined rate with respect to the output port 22. As a result, control is so conducted that output pressure P at the output port 22 holds to the following equation in response to an electromagnetic signal inputted to the electromagnet portion 3:

$$P=(F_{SOL}-F_{SP})/(A_1-A_2)$$

Figure 4:
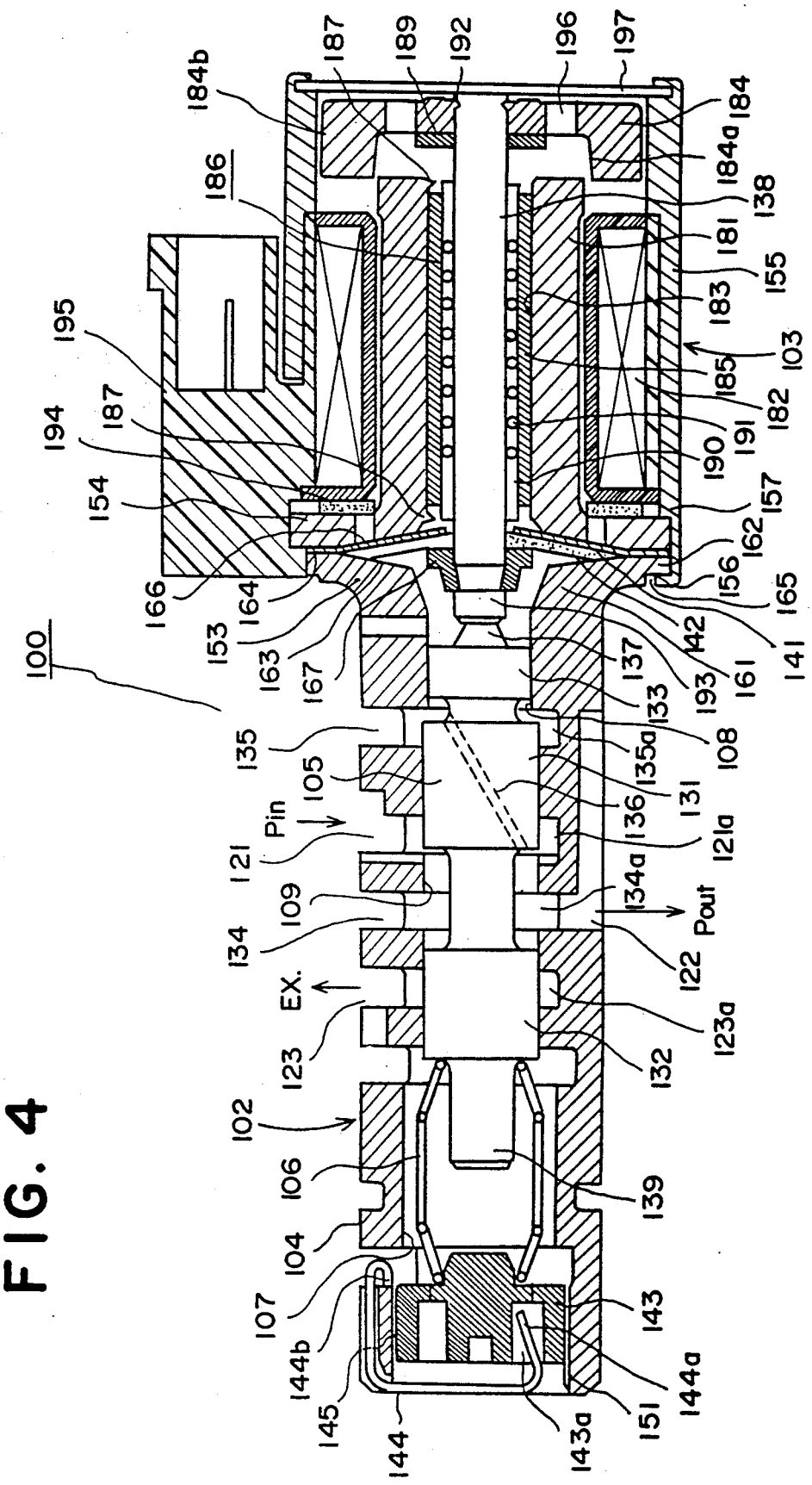
FIG. 4 is a cross sectional view which illustrates anther embodiment of the pressure control valve according to the present invention.

Next, a cross section of the pressure control valve according to another embodiment of the present invention as shown in FIG. 4 will be described.

Referring to the drawing, reference numeral 100 represents a pressure control valve including a pressure governing valve portion 102 and an electromagnet portion 103 similarly to the first embodiment. The pressure governing valve portion 102 is constituted by a valve sleeve 104 and a spool valve 105.

Referring to FIG. 4 which illustrates the pressure control valve 100, reference numeral 106 represents a spring, 107 represents a large-diameter hole capable of accommodating the spring 106, 108 represents a small-diameter guide hole, and 109 represents an intermediate-diameter guide hole. Reference numeral 121 represents a supply port, 122 represents an output port, and 123 represents an exhaust port. The port portions 121 and 123 in the valve sleeve 104 have annular cutouts 121a, 123a, 134a, and 135a.

The spool valve 105 comprises two land portions 131 and 132 having the same diameter and a small-diameter land portion 133 forming a space 134 and a closed space 135 in cooperation with the valve sleeve 104. A feedback oil passage 136 is formed in the land portion 131. Reference numeral 137 represents a projection, 138 represents a push rod, and 139 represents a column portion. Reference numerals 141, 187, and 189 represent stoppers.

The spring 106 is adjusted by driving a male screw member 143 into a female screw member 151. Reference numeral 143a represents a fastening hole, 144 represents a fitting pin, 144a represents a lower end portion of the fitting pin 144, and 145 represents a hole.

Reference numerals 153 and 154 represent flange portions of the valve sleeve 104 and the electromagnet portion 103, respectively. The two flange portions 153 and 154 are coupled to each other by bending an end portion 156 of the case 155. Reference numeral 157 represents a stepped portion, 161 represents a thick wall portion, 162 represents a thin wall portion, 163 and 166 represent tapered portions, 164 represents a periphery portion, and 165 represents an annularly stepped portion.

The electromagnet portion 103 comprises: a stationary portion constituted by a cylindrical core 181 and a coil assembly 182; and a movable portion constituted by a plunger 184 and a push rod 138. In the core 181, reference numeral 183 represents a hollow portion, 184a represents a recessed portion, 184b represents an outer surface, 185 represents a sleeve, 186 represents a linear type rolling bearing, 190 represents a bearing cage, 191 represents balls accommodated in the bearing cage 190, 193 represents a contact portion, 194 represents a ring made of unwoven fabric, 195 represents a connector, 196 represents an oil passage hole, and 197 represents a cover member.

The difference from the above-described first embodiment lies in the structure of the spool valve 105, and that of the valve sleeve 104 in the pressure governing valve portion 102, and in the structure coupling the pressure governing valve portion 102 and the electromagnet portion 103.

That is, the valve sleeve 104 has a large-diameter hole 107 capable of accommodating the spring 106, and, next to the hole 107, a small-diameter guide hole 108 capable of guiding the sliding movement of spool valve 105, and an intermediate-diameter guide hole 109 formed in its interior in the form of axially extending through holes.

A radially extending supply port 121, an output port 122, and an exhaust port 123 are successively formed in the valve sleeve 104 in communication with the above-described guide hole 109. In order to make the flow of oil smooth at each of the ports, annular recesses 121a, 123a, 134a, and 135a are, if necessary, provided.

The spool valve 105 has two land portions 131 and 132 having the same diameter and are guided in their sliding movement by the above-described intermediate-diameter guide hole 109. The spool valve 105 further has a small-diameter land portion 133 formed next to the land portion 131 which is intimately guided by the small-diameter guide hole 108. The distance between the two land portions 131 and 132 having the same diameter is determined so as to enable the output port 122 to alternately communicate with the supply port 121 and the exhaust port 123 at a predetermined ratio by the sliding of the spool valve 105. A space 134 formed between the land portions 131 and 132 is always connected to the output port 122.

A closed space 135 formed by the land portion 131, the small-diameter land portion 133, and the guide holes 108 and 109 is connected to the space 134 formed between the land portions 131 and 132 by a feedback oil passage 136. The feedback oil passage 136 diagonally penetrates the land portion 131 so that output pressure obtained at the output port 122 is fed back to the closed space 135.

The projecting portion 137 projecting from the central portion of the end surface of the small-diameter land portion 133 is arranged to be brought into contact with the push rod 138 of the electromagnet portion 103 to be described later, while a column portion 139 projecting from the central portion of the end surface of the land portion 132 serves to limit the stroke of the spool valve 105 as well as serving as a guide for the spring 106.

In order to apply a load to the spring 106, the hole 145 formed in the valve sleeve 104 has a female screw member 151 formed thereon, and a male screw member 143 which is adapted mate with the female screw member 151 is inserted therein. As a result, the spring 106 can be pressed against the end surface of the spool valve 105 by turning the male screw member 143 in the hole 145. Furthermore, the compression degree of the spring 106 can be varied by adjusting the angular degree of the rotation of the male screw member 143.

When the pressure governing valve portion 102 is assembled, first the spool valve 105 is, from left, inserted into the guide hole 108 formed in the valve sleeve 104 with the small-diameter land portion 133 positioned at an end portion of the hole 108. On the other hand, the spring 106 is inserted through the hole 145 so as to surround the column portion 139 and to come contact with the end surface of the land portion 132. Thus, the spring 106 is compressed by a predetermined degree by screwing the male screw member 143 into the female screw member 151 formed in the valve sleeve 104.

The joint portion between the pressure governing valve portion 102 and the electromagnet portion 103 is formed in such a manner that the linear type rolling bearing 186 accommodated in the sleeve 185 of the electromagnet 103 is able to move freely within the space in the sleeve 185 between the stopper 141 comprising a belleville spring disposed at the left end of the push rod 138 and a brass stopper 189 disposed adjacent to the plunger 184. A member 142 made of unwoven fabric is provided for the stopper 141 at a position adjacent to the pressure governing valve portion 102. The unwoven fabric member 142 is secured by a stopper ring 167.

As a result of the structure according to this embodiment as described above, when hydraulic oil is supplied to the supply port 121 of the valve sleeve 104 from a pump or the like, the hydraulic oil from the supply port 121 then reaches a space 134 formed between the land portions 131 and 132 of the spool valve 105 after it has passed through an opening between the valve sleeve 104 and the land portion 131 of the spool valve 105. Then, the hydraulic oil passes through the output port 122 of the valve sleeve 104 which is in constant communication with the space 134 for supply to each hydraulic pressure apparatus in the hydraulic pressure system such as an automatic transmission.

Pressure P of the hydraulic oil outputted through the output port 122 is simultaneously fed back via the feedback oil passage 136. Pressure P is transmitted to the closed space 135 formed by the land portion 131, the small-diameter land portion 133 and the valve sleeve 104 so that an output pressure feedback load corresponds to the area difference $A_1-A_2$ given by subtracting cross sectional area $A_2$ of the small-diameter land portion 133 from cross sectional area $A_1$ of the land portion 131.

The thus generated output pressure feedback load $(A_1-A_2)P$ is added to force $F_{sol}$ which is generated by the electromagnet portion 103. Thus, the spool valve 105 is pressed to left when viewed in the drawing with synthesized force $(A_1-A_2)P+F_{SOL}$. As a result, the spool valve 105 moves to the position at which the above-described synthesized force balances with force $F_{SP}$ which is the urging force from the spring 106.

As a result of the movement of the spool valve 105, the land portions 131 and 132 move so that the supply port 121 and the exhaust port 123 of the valve sleeve 104 are controlled in such a manner that they are opened/closed at a predetermined rate with respect to the output port 122. As a result, control is so conducted that output pressure P at the output port 122 holds to the following equation in response to an electromagnetic signal inputted to the electromagnet portion 103:

$$P=(F_{SP}-F_{SOL})/(A_1-A_2)$$

As many apparently widely different embodiments of this invention may be made without departing from the spirit and scope thereof, it is to be understood that the invention is not limited to the specific embodiments thereof except as defined in the appended claims.

What we claim is:

1. A pressure control valve comprising:
   (a) a valve sleeve having a supply port, an output port, and an exhaust port;
   (b) an electromagnet connected to said valve sleeve for producing a load in response to an electric signal;
   (c) a spool valve mounted in said valve sleeve for sliding motion responsive to said load produced by said electromagnet in a first direction, said spool valve having a first land portion, through which a feedback oil passage is formed diagonally, and second and third land portions, wherein said first and second land portions have the same first diameter and define a first space therebetween in fluid communication with said output port and wherein said third land portion has a second diameter smaller than said first diameter, said first and third land portions defining therebetween a closed second space to which output pressure is fed back to produce a feedback load acting on said spool valve in a second direction; and
   (d) a spring mounted in said valve sleeve for biasing said spool valve in said second direction.

2. A pressure control valve according to claim 1, wherein said spool valve has a bevel cut as a chord into the circumference of an end surface of its land portion.

3. A pressure control valve according to claim 2, wherein said valve sleeve has a circumferentially extending slot cutout associated with at least one of said supply port, output port, and exhaust port.

4. A pressure control valve according to claim 1, wherein said valve sleeve has a circumferentially extending slot cutout associated with at least one of said supply port, output port, and exhaust port.

* * * * *